(12) United States Patent  
Hopkins et al.

(10) Patent No.: US 7,657,984 B2
(45) Date of Patent: Feb. 9, 2010

(54) ROBOT POSITIONED WELDING TIP DRESSER

(75) Inventors: Brian Hopkins, Ortonville, MI (US); Melissa Wilkins, Macomb, MI (US)

(73) Assignee: Hirotec America, Inc., Auburn Hills, MI (US)

( * ) Notice: Subject to any disclaimer, the term of this patent is extended or adjusted under 35 U.S.C. 154(b) by 44 days.

(21) Appl. No.: 12/214,315

(22) Filed: Jun. 17, 2008

(65) Prior Publication Data

US 2008/0317577 A1  Dec. 25, 2008

Related U.S. Application Data

(60) Provisional application No. 60/936,412, filed on Jun. 20, 2007.

(51) Int. Cl.
*B23P 23/00* (2006.01)
*B23C 3/00* (2006.01)
*B23K 11/30* (2006.01)

(52) U.S. Cl. .................. 29/33 R; 29/56.5; 409/140; 409/201; 409/214; 409/131; 451/28; 451/280

(58) Field of Classification Search ......... 409/138–140, 409/131, 201, 211, 210, 214, 218; 29/33 R, 29/56.5, 57; 451/28, 51, 57, 236, 280; 901/2, 901/41–42
See application file for complete search history.

(56) References Cited

U.S. PATENT DOCUMENTS 2,357,038 A * 8/1944 Whitesell, Jr. ............ 219/86.33
4,842,456 A * 6/1989 Saito ........................ 409/140
6,722,004 B2 * 4/2004 Recupero .................. 409/140
2007/0084833 A1 * 4/2007 Xidacis .................... 219/69.15

FOREIGN PATENT DOCUMENTS

JP  62-173089 A  *  7/1987
JP  01-130886 A  *  5/1989
JP  2000-107866 A  *  4/2000

OTHER PUBLICATIONS

Machine Translation of JP-2000-107866 (which patent was published in Apr. 2000).*

* cited by examiner

*Primary Examiner*—Erica E Cadugan
(74) *Attorney, Agent, or Firm*—Fildes & Outland, P.C.

(57) ABSTRACT

A robot positioned welding tip dresser assembly includes a pivot arm pivotally mountable on a welding gun apparatus. The pivot arm is pivotal about a pivot point. A welding tip dresser is mounted on a distal end of the pivot arm. A first retaining tab extends from the pivot arm. The first retaining tab includes an opening extending therethrough. At least one positioning mechanism is disposed relative to the pivot point and is cooperable with the first retaining tab to retain the pivot arm in one of a home position and a working position. The first retaining tab is engagable by end-of-arm tooling of a robot. The end-of-arm tooling is operable to release the positioning mechanism, and movement of the robot moves the pivot arm between the home and working positions.

8 Claims, 1 Drawing Sheet

ROBOT POSITIONED WELDING TIP DRESSER

CROSS REFERENCE TO RELATED APPLICATION

This application claims the priority of U.S. Provisional Application No. 60/936,412 filed Jun. 20, 2007.

TECHNICAL FIELD

This invention relates to robot actuated positioning mechanisms for moving a welding tip dresser for a pedestal welding gun between idle and working positions.

BACKGROUND OF THE INVENTION

Traditional tip dresser applications used with pedestal welding guns in automotive body shop tooling generally utilize either a commercial power pivot unit or a manufactured power pivot that is driven by a pneumatic cylinder. Current body shop pedestal welding guns have powered positioning devices that bring in a welding tip dresser for cutting of the weld gun caps (dressing). The drive units may be a pneumatic cylinder or a commercial power pivot for actuating the positioning device. These drive units require positive stops, valves, shock absorbers, flow controls, pneumatic hoses and power sources for the drive unit to function. A simplified manner of actuating the tip dresser between idle and working positions was desired.

SUMMARY OF THE INVENTION

The present invention makes use of a robot that is already present within the assembly cell to supply power for actuating a non-powered positioning device for moving the tip dresser. The robot may be modified by adding a single fixed actuator rod to existing end-of-arm tooling. The positioning device is designed as a non-powered mechanism that supports the tip dresser and controls its motion between an idle, or home, position and a working position for dressing the weld gun tip.

In an exemplary embodiment, an arm supporting the tip dresser is mounted on a pivot carried on a side of the weld gun pedestal. In the working position, the arm holds the dresser in position for dressing the weld tip. In the idle position, the arm is pivoted away from weld tip to allow use of the weld gun. Spring loaded retainer plungers (latches) mounted on the pedestal are operative to engage retainer openings in tabs (keepers) on the pivot arm to maintain the mechanism in either the idle or working position.

In operation, the robot inserts the actuator rod into a first keeper opening to engage and release the spring retainer and then pivots the arm to the working position of the dresser where the second retainer engages a second keeper to hold the mechanism in the working position. When the dressing is completed, the robot inserts the rod into the second keeper opening to release the retainer and pivots the arm back to the idle position where the first retainer is again engaged to hold the arm in the idle position.

The invention provides a much simpler positioning mechanism for carrying out the dressing operation by using the existing robot to move the mechanism instead of requiring additional powered devices for operating the positioning mechanism.

These and other features and advantages of the invention will be more fully understood from the following detailed description of the invention taken together with the accompanying drawings.

DETAILED DESCRIPTION OF THE INVENTION

Figure 1:
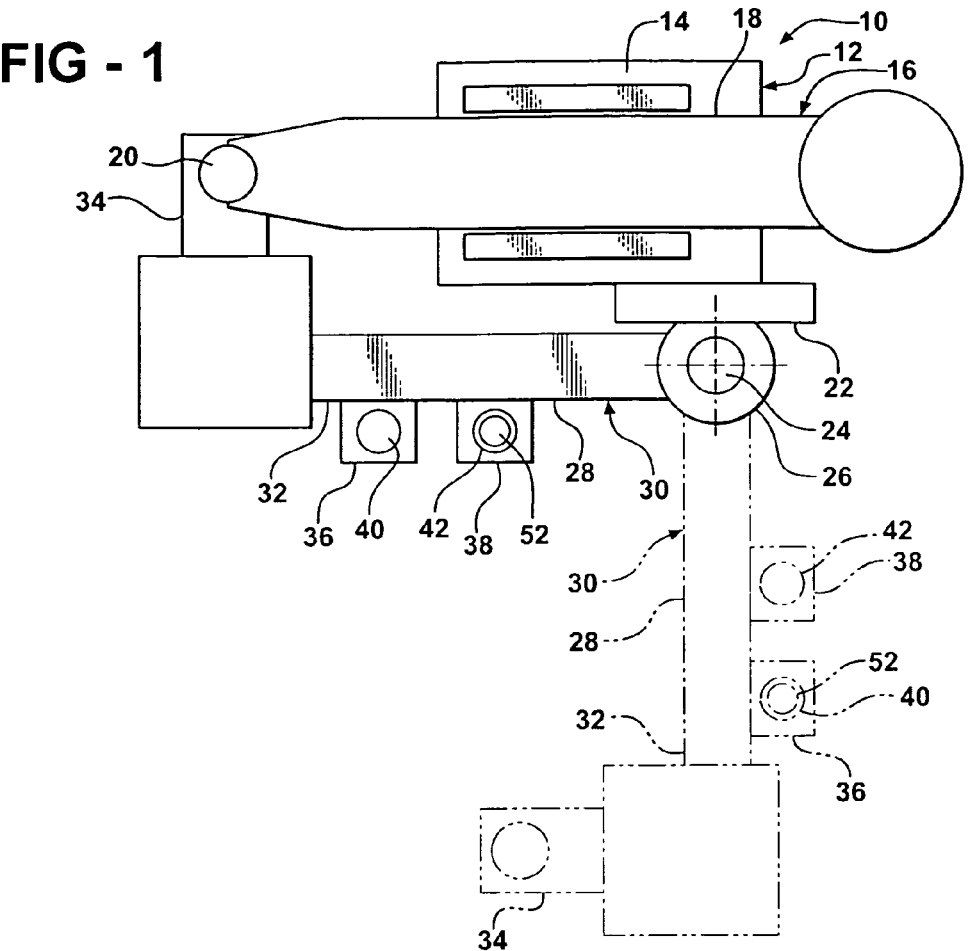
FIG. 1 is a schematic top view of an exemplary pedestal and tip-dresser assembly with an associated welding gun and the tip dresser mechanism shown in the working position with the idle position of the mechanism shown in phantom.

Referring first to FIG. 1 of the drawings, numeral 10 generally indicates a pedestal welding gun assembly. Assembly 10 includes a pedestal 12 having a support 14 on which a welding gun 16 is carried. The gun 16 has a body 18 with a tip 20, which extends beyond the pedestal support 12.

On one side 22, the pedestal mounts a pivot 24 carrying a pivotable end 26 of a pivoting arm 28 comprising part of a positioning mechanism 30. On an end 32 of the arm 28 distal from the pivot 24, a welding tip dresser 34 is mounted. The tip dresser 34 is shown engaging the welding tip 20 with the mechanism 30 in a working position ready to dress the tip between welding operations.

Extending from a lower side of the arm 28 is a longitudinally spaced pair of retaining tabs 36, 38. The tabs include retainer (keeper) openings 40, 42, respectively. The first tab opening 40 is used in retaining the mechanism 30 in an idle position, shown in phantom with dashed lines. The second tab opening 42 is used in retaining the mechanism 30 in the working position, shown in solid lines, as will subsequently be more fully described.

Figure 2:
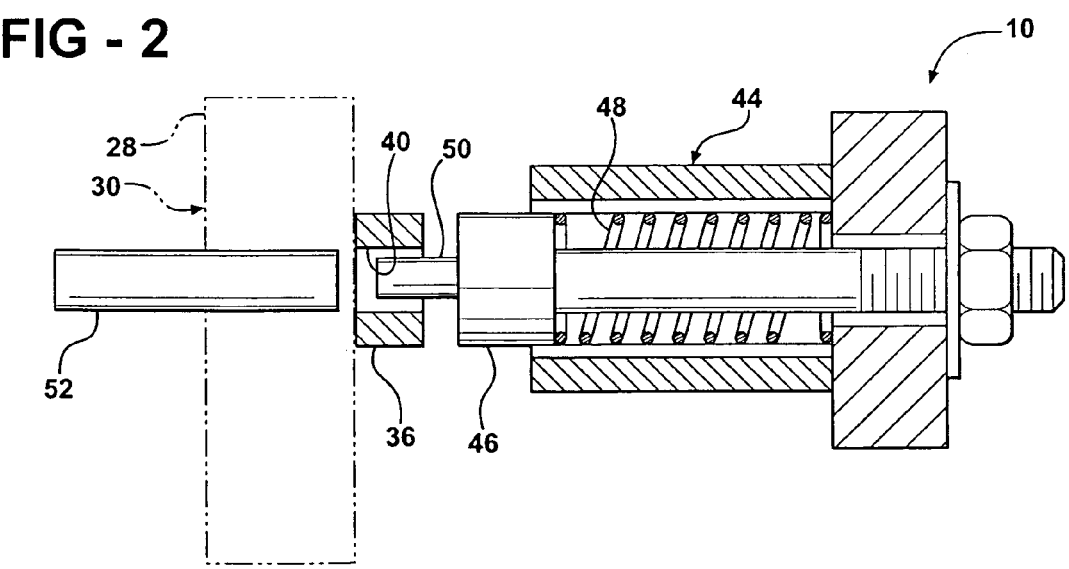
FIG. 2 is a solid-line side view of a part of FIG. 1 in partial section, showing the spring loaded retainer and keeper of the dresser mechanism in the idle position with the swing arm shown in phantom.

FIG. 2 of the drawings illustrates a side view of retaining and actuating devices forming part of the positioning mechanism viewed from the line 2-2 of FIG. 1 but with the mechanism in the idle position shown in dashed lines. FIG. 2 shows a spring-loaded retainer 44 having a plunger 46 urged outward by a spring 48. The plunger 46 has a smaller diameter end forming a latch 50 that extends into the first keeper opening 40 of the first tab 36. The tab 36 protrudes from under the arm 28 and is used to retain the mechanism 30 in the idle position. The retainer 44 is mounted relative to the pivoting arm 28 and is positioned in alignment with the tab 36 when the pivoting arm is in the idle home position.

A second retainer 44 is provided with a plunger 46, spring 48 and latch 50 that extends into the second keeper opening 42 of tab 38, shown in FIG. 1, to retain the positioning mechanism 30 in the working position when it is so positioned. The second retainer 44 is mounted relative to the pivoting arm 28 and is positioned in alignment with the tab 38 when the pivoting arm is in the working position. The lower surfaces 50 of the tabs 36, 38 preferably include chamfers or ramps to allow the individual latches 50, when engaging their respective tabs 36, 38, to ride up the ramps and compress the springs so that the latches can enter their respective keeper openings 40, 42 and retain the positioning mechanism in its respective positions.

FIG. 2 also shows the actuator rod 52 added to the end-of-arm tooling of the robot used to release and position the mechanism 30, but not otherwise shown in the drawings.

In FIG. 1, the sectioned circle 52 shown aligned with the dashed first retainer opening (keeper) 40 represents the robot actuator rod 52 positioned above the keeper 40, as shown in FIG. 2, ready to release and reposition the mechanism 30 into the working position. The sectioned circle 52 in FIG. 1 aligned with the solid line second retainer opening 42 represents the same robot actuator rod 52 positioned similarly above the keeper 42 ready to release and return the mechanism 30 to the idle position.

In operation, to move the positioning mechanism 30 from the idle position to the working position, the robot inserts the actuator rod 52 into the first keeper opening 40 of the first tab 36 to engage and release the associated spring retainer 44. While continuing to hold the rod 52 in the opening, the robot then pivots the arm 28 to the working position of the dresser where the second retainer 44 engages the second keeper opening 42 to hold the mechanism in the working position. The robot may be idle or be otherwise utilized during the dressing action.

When the dressing action is completed, the robot inserts the rod 52 into the second keeper opening 42 to release the retainer and then pivots the arm 28 back to the idle position where the first retainer 44 is again engaged with the first opening 40 of the first tab 36 to again hold the arm 38 in the idle position.

Through use of the above described embodiment of the invention, the addition of the actuator rod 52 to the robot end of arm tooling allows a non-powered positioning mechanism to be actuated by the available robot and replaces or avoids the use of more complicated and expensive powered actuating mechanisms for positioning the dresser.

In an alternative embodiment, the robot could be used to maintain the non-powered mechanism in the working position during the dressing action. This would eliminate the need for a second spring-loaded retainer and additional repositioning motions of the robot.

Another option to eliminate spring-loaded retainers would be to install a small pneumatic cylinder that would act as a lock device to retain the non-powered positioning mechanism in the idle position.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A robot positioned welding tip dresser assembly comprising:
   a pivot arm pivotally mountable on a welding gun apparatus, said pivot arm being pivotal about a pivot point;
   a welding tip dresser mounted on a distal end of said pivot arm distal from the pivot point;
   a first retaining tab extending from said pivot arm, said first retaining tab including an opening extending therethrough; and
   at least one positioning mechanism disposed relative to said pivot point and cooperable with said first retaining tab to retain said pivot arm in one of a home position and a working position;
   wherein said first retaining tab is engagable by end-of-arm tooling of a robot, said end-of-arm tooling is operable to release said at least one positioning mechanism, and movement of said robot moves said pivot arm between said home and working positions.

2. The robot positioned welding tip dresser assembly of claim 1, including a second retaining tab extending from said pivot arm, said second retaining tab including an opening extending therethrough;
   wherein said second retaining tab is engagable by the end-of-arm tooling of the robot for movement of said pivot arm between said home and working positions.

3. The robot positioned welding tip dresser assembly of claim 2, wherein the at least one positioning mechanism includes first and second positioning mechanisms disposed relative to said pivot point;
   said first positioning mechanism being cooperable with said first retaining tab to retain said pivot arm in one of said home position and said working position;
   said second positioning mechanism being cooperable with said second retaining tab to retain said pivot arm in the other of said home and working positions.

4. The robot positioned welding tip dresser assembly of claim 1, wherein said at least one positioning mechanism includes a spring-loaded plunger and a latch extending from said plunger, said latch being insertable in said opening of said first retaining tab.

5. The robot positioned welding tip dresser assembly of claim 4, wherein said latch is engagable by said robot end-of-arm tooling to release said at least one positioning mechanism.

6. The robot positioned welding tip dresser assembly of claim 1, wherein said pivot arm is pivotally mountable on a pedestal of the welding gun apparatus.

7. A method of positioning a welding tip dresser, said method comprising the steps of:
   pivotally mounting a pivot arm on a welding gun apparatus, said pivot arm being pivotal about a pivot point and including a first retaining tab having an opening extending therethrough;
   mounting a welding tip dresser on a distal end of said pivot arm;
   disposing at least one positioning mechanism relative to said pivot point, said at least one positioning mechanism being cooperable with said first retaining tab to retain said pivot arm in one of a home position and a working position; and
   using robot end-of-arm tooling to engage said first retaining tab to release said at least one positioning mechanism and move said pivot arm between said home and working positions.

8. The method of claim 7, wherein said pivot arm includes a second retaining tab having an opening extending therethrough, and wherein said at least one positioning mechanism includes first and second positioning mechanisms;
   said method further including the steps of:
   engaging said second retaining tab with said robot end-of-arm tooling for movement of said pivot arm between said home and working positions;
   disposing said first and second positioning mechanisms relative to said pivot point;
   engaging said first positioning mechanism with said first retaining tab to retain said pivot arm in one of said home and working positions; and
   engaging said second positioning mechanism with said second retaining tab to retain said pivot arm in the other of said home and working positions.

* * * * *